(12) United States Patent
Fenton et al.

(10) Patent No.: US 9,942,222 B1
(45) Date of Patent: Apr. 10, 2018

(54) AUTHENTICATION WITH WEARABLE DEVICE

(71) Applicant: AMAZON TECHNOLOGIES, INC., Reno, NV (US)

(72) Inventors: Jacob Howard Fenton, Seattle, WA (US); Arnaud Marie Froment, San Jose, CA (US); Leo Benedict Baldwin, San Jose, CA (US); Albert William Wegener, Aptos, CA (US)

(73) Assignee: Amazon Technologies, Inc., Reno, NV (US)

( * ) Notice: Subject to any disclaimer, the term of this patent is extended or adjusted under 35 U.S.C. 154(b) by 359 days.

(21) Appl. No.: 14/475,269

(22) Filed: Sep. 2, 2014

(51) Int. Cl.
*G06F 17/00* (2006.01)
*H04L 29/06* (2006.01)

(52) U.S. Cl.
CPC ...... *H04L 63/0853* (2013.01); *H04L 63/0861* (2013.01); *H04L 63/20* (2013.01)

(58) Field of Classification Search
CPC . H04L 63/0853; H04L 63/0861; H04L 63/20; H04L 63/0876; H04L 9/321; H04L 9/3215; H04L 9/3213; H04L 9/32; G06F 21/44
USPC .................................................. 726/1, 4, 7
See application file for complete search history.

(56) References Cited

U.S. PATENT DOCUMENTS

| | | | | |
|---|---|---|---|---|
| 8,963,806 B1* | 2/2015 | Starner | ............... | G02B 27/0093 345/7 |
| 9,032,501 B1* | 5/2015 | Martin | ................... | H04L 9/3213 713/155 |
| 9,197,414 B1* | 11/2015 | Martin | .................. | H04L 9/0822 |
| 9,317,110 B2* | 4/2016 | Lutnick | ................... | G06F 3/011 |
| 2002/0151775 A1* | 10/2002 | Kondo | ............... | A61B 5/02438 600/344 |
| 2003/0025603 A1* | 2/2003 | Smith | ..................... | G06F 21/35 340/572.8 |
| 2005/0071647 A1* | 3/2005 | Fujinuma | ................ | G06F 21/32 713/186 |
| 2009/0037526 A1* | 2/2009 | Elliott | ..................... | A63F 13/12 709/203 |
| 2009/0322540 A1* | 12/2009 | Richardson | .......... | A61B 5/0002 340/573.7 |
| 2012/0200499 A1* | 8/2012 | Osterhout | .......... | G02B 27/0093 345/158 |
| 2013/0259005 A1* | 10/2013 | Kulkarni | ............... | H04W 36/30 370/332 |
| 2013/0262298 A1* | 10/2013 | Morley | ................... | H04M 1/05 705/39 |

(Continued)

*Primary Examiner* — Thu Ha Nguyen
(74) *Attorney, Agent, or Firm* — Lindauer Law, PLLC

(57) ABSTRACT

Described are techniques and systems for providing authentication credentials associated with a user. The user is authenticated using one or more techniques, such as multi-factor authentication using one or more biometric characteristics, biomedical data, passwords, and so forth, to generate authentication data. The authentication data may be used in conjunction with information about a wearable device ("wearable"), such as a wristband. Authentication may be confirmed upon an indication that the wearable has not been removed, tampered with, and so forth. In some implementations the wearable device may store and distribute the authentication credentials to requesting devices so long as the wearable has not been removed, tampered with, and so forth.

20 Claims, 8 Drawing Sheets

(56) References Cited

U.S. PATENT DOCUMENTS

| | | | |
|---|---|---|---|
| 2014/0101755 A1* | 4/2014 | Tang | G06F 21/35 726/20 |
| 2014/0180582 A1* | 6/2014 | Pontarelli | G08B 6/00 701/494 |
| 2014/0187148 A1* | 7/2014 | Taite | H04M 1/7253 455/41.1 |
| 2014/0273858 A1* | 9/2014 | Panther | A61B 5/0002 455/41.2 |
| 2014/0282877 A1* | 9/2014 | Mahaffey | H04L 63/0853 726/3 |
| 2014/0330408 A1* | 11/2014 | Rolley | G06F 19/3481 700/91 |
| 2014/0372762 A1* | 12/2014 | Flautner | H04L 9/3226 713/173 |
| 2014/0375461 A1* | 12/2014 | Richardson | G08B 21/0446 340/573.7 |
| 2015/0028996 A1* | 1/2015 | Agrafioti | G06F 21/40 340/5.82 |
| 2015/0133193 A1* | 5/2015 | Stotler | G06F 1/163 455/557 |
| 2015/0277557 A1* | 10/2015 | Raffa | G06F 3/014 345/156 |
| 2015/0309582 A1* | 10/2015 | Gupta | G06F 3/014 345/156 |
| 2015/0331589 A1* | 11/2015 | Kawakita | G06F 1/163 715/834 |
| 2015/0356289 A1* | 12/2015 | Brown | G06F 21/44 726/7 |
| 2015/0381609 A1* | 12/2015 | Dadu | H04L 63/0861 726/9 |
| 2016/0004224 A1* | 1/2016 | Pi | G04G 21/025 368/10 |
| 2016/0036810 A1* | 2/2016 | Kim | H04L 63/0861 726/7 |
| 2016/0042172 A1* | 2/2016 | Chiplunkar | G06F 21/36 726/19 |
| 2016/0050217 A1* | 2/2016 | Mare | H04L 9/3215 726/4 |
| 2016/0062514 A1* | 3/2016 | Jo | G02B 27/017 345/174 |
| 2016/0100305 A1* | 4/2016 | Karampatsis | H04L 63/08 370/328 |
| 2016/0112520 A1* | 4/2016 | Ganu | H04L 67/142 709/223 |
| 2016/0133119 A1* | 5/2016 | Bone | G08B 21/245 340/691.6 |
| 2016/0134932 A1* | 5/2016 | Karp | H04N 21/4431 348/155 |
| 2016/0140825 A1* | 5/2016 | Watkins | G06F 19/3418 340/573.1 |
| 2016/0154952 A1* | 6/2016 | Venkatraman | H04L 63/0861 705/44 |
| 2016/0189134 A1* | 6/2016 | Voege | G06Q 20/3226 705/44 |
| 2016/0196760 A1* | 7/2016 | Koo | G09B 19/003 434/247 |
| 2016/0209648 A1* | 7/2016 | Haddick | G02B 27/0093 |
| 2016/0212695 A1* | 7/2016 | Lynch | H04W 48/08 |
| 2016/0306955 A1* | 10/2016 | Martin | G06F 21/35 |
| 2016/0330770 A1* | 11/2016 | Lee | H04W 76/007 |
| 2016/0337863 A1* | 11/2016 | Robinson | H04W 12/08 |
| 2016/0377491 A1* | 12/2016 | Ban | G01K 1/20 374/1 |
| 2017/0023973 A1* | 1/2017 | Kim | G06F 1/1626 |
| 2017/0039358 A1* | 2/2017 | Yuen | G06F 3/017 |
| 2017/0055110 A1* | 2/2017 | Tian | G04G 21/04 |
| 2017/0119295 A1* | 5/2017 | Twyman | A61B 5/164 |
| 2017/0180130 A1* | 6/2017 | Martin | H04L 9/3231 |

\* cited by examiner

AUTHENTICATION WITH WEARABLE DEVICE

BACKGROUND

A wide variety of services and devices may authenticate information such as an identity of a user to provide particular services. For example, the identity of the user may be authenticated to authorize a payment, or biometric information may be authenticated as originating from a particular device. It is desirable to provide for strong authentication of information such as identity, while minimizing inconvenience to the user.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

Figure 1:
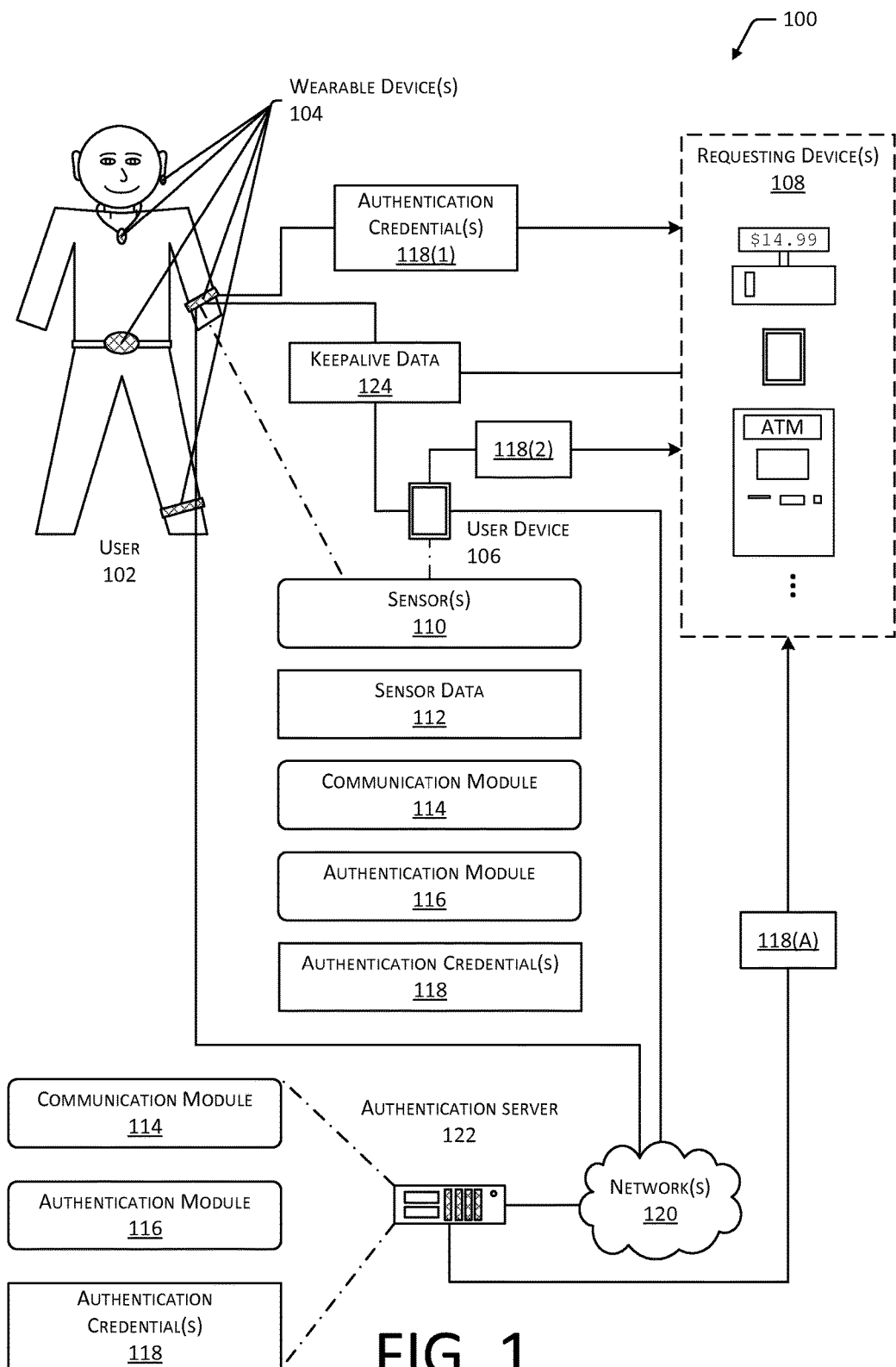
FIG. 1 is an illustrative system that may include a user, a wearable device, a user device that may operate in conjunction with the wearable device, and a requesting device to receive authentication credentials from the wearable device.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Authentication involves a determination as to the truth of something or an attribute of that thing. In some implementations, authentication may include confirming an identity of a user or of a device. An authentication process may involve the use of one or more factors such as something the user knows, something the user has, or something inherent about the user. The something the user knows may be a username and password. The something the user has may be a physical token, such as an object. The something inherent about the user may comprise fingerprints, facial features, iris patterns, and so forth, of the user. Different levels of confidence of authentication may be used in different situations. For example, a transfer of funds may call for highly confident authentication of the user's identity. In comparison, accessing an electronic book at a library may call for authentication with lesser confidence.

Use of multiple factors during authentication may improve confidence in the resulting authentication. For example, the identity of a user may be authenticated by using one or more factors such as a password provided by the user, the user presenting a physical token, the user providing a fingerprint, and so forth to provide authentication with a high degree of confidence. Such multifactor authentication may be used in transactions such as funds transfers, access to personally identifiable information, and so forth. However, multifactor authentication may be cumbersome to use. For example, the user may be inconvenienced by repeatedly providing information to authenticate themselves throughout the day as requested by various devices or services including, but not limited to: using a vehicle, unlocking a computing device, opening a door, authorizing a financial transaction, and so forth.

Described in this disclosure are techniques and systems that use a wearable device to provide authentication credentials to a requesting device. The wearable device may be implemented in various physical form factors including, but not limited to, the following: hats, headbands, hair clips, earrings, necklaces, pendants, brooches, torcs, armlets, brassards, bracelets, wristbands, belts, anklets, tokens, key fobs, and so forth.

The wearable device may include one or more sensors configured to acquire sensor data, a communication module configured to communicate with devices external to the wearable device, an authentication module, and computer-readable storage media (CRSM) such as flash memory. Authentication credentials may be generated by the at least in part wearable device, or may be received from another device and stored by the wearable device. The wearable device may provide the authentication credentials to a requesting device. The requesting device may be configured to issue a request such as a radio frequency (RF) transmission for authentication credentials, or may receive the authentication credentials without issuing a request. The requesting device may comprise a vehicle, point-of-sale system, financial transaction terminal, building control system, or other computing device configured to use authentication credentials during operation.

The wearable device may be configured to provide the authentication credentials based at least in part on sensor data from one or more sensors of the wearable device. The sensors of the wearable device may be configured to determine proximity of the user or a portion of the user to the wearable device. For example, an optical proximity sensor may be configured to emit an optical signal such as infrared light and determine presence of a portion of the user's skin and generate proximity data indicative of the presence or absence of the user's skin. The sensors may also include a latch sensor configured to generate sensor data indicating a latch of the wearable device is in an open state or a closed state. In one implementation, the wearable device may be configured to provide the authentication credentials after the sensor data indicates proximity of the user and the wearable device is in a closed state.

The wearable device, upon a determination that one or more events have occurred, may take one or more actions. For example, the event may include the latch state changing from closed to open, absence of detection of the user by the optical proximity sensor, expiration of a timeout time, availability of an update to software for the wearable device, and so forth. The one or more actions may include, but are not limited to, discontinuing the providing of the authentication credentials, providing deauthentication data to the requesting device, shutting down the wearable device, and so forth. For example, failure to update or to reload the computer-executable instructions in the memory of the wearable device within the last seven days may prevent the wearable device from providing authentication credentials until an update or reload has taken place.

During operation of the system, the wearable device allows the use of multifactor authentication without the associated inconvenience. For example, in the morning, the user may don the wearable device by latching a wristband of the wearable device around the user's forearm above the wrist. The user may participate in a multifactor authentication process that results in the delivery of authentication credentials or a token indicative of the authentication credentials to the wearable device for storage and subsequent distribution. For example, the multifactor authentication process may include receiving fingerprint data indicative of a fingerprint of the user, determining proximity of a user device such as a smartphone, tablet, or set-top box in communication range of the wearable device, acquiring an image of the user or of a part of the user's body, and entry of a username and password. By determining that values associated with these factors correspond to previously stored values, the identity of the user may be authenticated with a high degree of confidence. Once determined, the authentication credentials may be provided to, or made accessible by, the wearable device.

Subsequently, the wearable device provides or otherwise enables the transfer of authentication credentials to the requesting devices. Until an event designated as "deauthenticating the wearable device" occurs, the wearable device may participate in providing the authentication credentials. For example, so long as the wearable device remains proximate to the user, the latch of the wearable device remains closed, an expiration time limit has not been reached, and so forth, the authentication credentials may continue to be provided to the requesting device(s) or the previously provided authentication credentials may be designated as valid.

Continuing the example, as the user goes through the day, the wearable device provides authentication credentials with a high degree of confidence as to the identity of the user to the requesting devices with little or no action on the part of the user. For example, the wearable device may be configured to present with a user interface an indication of a request for authentication credentials from the requesting device. The user may provide input to control whether the authentication credentials are provided to the requesting device.

However, should a deauthenticating event occur, one or more actions may take place or may be discontinued. For example, the authentication credentials may no longer be provided, the deauthentication data may be sent to the requesting device, the wearable device may be turned off, keepalive data sent by the wearable device may be discontinued, and so forth. Continuing the example above, should the wearable device be removed from the forearm of the user, the authentication credentials stored therein may be erased or otherwise rendered unusable. Subsequently, the user would need to participate again in the multifactor authentication process to provide the wearable device with the authentication credentials.

In other implementations, the authentication credentials may be provided by the user device, an authentication server or other computing device, and so forth. For example, the user device such as a smartphone may be configured to provide the authentication credentials so long as keepalive data is exchanged between the wearable device and the user device within a threshold amount of time. Should the keepalive data be absent for longer than a threshold period of time, the user device may discontinue providing authentication credentials, send deauthentication data to the requesting device, and so forth.

The wearable device provides or otherwise facilitates provisioning of authentication credentials to requesting devices. This facilitation may improve the user experience while also allowing the requesting devices to authenticate the user with a high degree of confidence and without imposing the inconvenience of ongoing authentication.

Illustrative System

FIG. 1 is an illustrative system 100 for providing authentication credentials to the requesting device. A user 102 may have one or more wearable devices 104 on or about their person. The wearable device 104 may be implemented in various physical form factors including, but not limited to, the following: hats, headbands, hair clips, earrings, necklaces, pendants, brooches, torcs, armlets, brassards, bracelets, wristbands, belts, anklets, tokens, key fobs, and so forth. In some implementations the wearable device 104 may be worn internally to the user 102. For example, the wearable device 104 may be implanted or swallowed. In this illustration, wearable devices 104 are depicted as an earring, a pendant, a wristband or bracelet, a belt, and an anklet.

The system 100 may also include one or more user devices 106. The user device 106 may comprise a smart phone, tablet computer, electronic book (e-book) reader device, set-top box, media player, gaming console, personal computer, or other computing device. The user device 106 may be configured for operation from a fixed location or may be portable. For example, the set-top box may be designed to plug into televisions and other devices for operation while in a single physical location. In another example, smartphones, tablet computers, e-book readers, and so forth, may be suitable for use in any location, while the user 102 is moving, and so forth.

The wearable device 104, the user device 106, or other devices may communicate with one or more requesting devices 108. The requesting device 108 may include a vehicle, point-of-sale system, financial transaction terminal, building control system, smartphone, tablet computer, or other computing device.

The computing devices described herein, such as the wearable device 104 and the user device 106, may include one or more sensors 110 configured to generate sensor data 112. In some implementations the sensor data 112 may comprise information indicative of a match or correspondence between the sensor data 112 and a previously stored value. For example, the sensor data 112 may indicate that a fingerprint received by a fingerprint scanner matches previously stored fingerprint data. The sensor data 112 may comprise "raw" data from the sensor 110, digest data derived from the sensor data 112, a hash of the data generated by the sensor 110, and so forth. The sensors 110 are discussed in more detail with regard to FIG. 2. The computing device is discussed in more detail below with regard to FIG. 3. The computing device may include a communication module 114 configured to establish communication with another device. For example, the communication module 114 of the wearable device 104 may be configured to establish communication with the user device 106, the requesting device 108, and so forth. An authentication module 116 is configured to provide authentication credentials 118 based at least in part on sensor data 112. For example, the authentication module 116 may compare the sensor data 112 with previously stored data to provide authentication of the identity of the user 102.

The authentication credentials 118 may comprise one or more of a username, a password, encrypted data, security token, a cryptographic value, and so forth. In some implementations, the authentication credentials 118 may comprise data signed using a digital certificate.

The computing devices may be configured to couple to one or more networks 120. The networks 120 may include personal area networks (PANs), local area networks (LANs), wide area networks (WANs), and so forth. The networks 120 may be wired or wireless. The computing devices of the system 100 may use the one or more networks 120 to communicate.

The authentication module 116 of the wearable device 104 may provide authentication credentials 118 based at least in part on sensor data 112 from sensors 110 onboard or in communication with the wearable device 104. For example, the proximity and a latch sensor 110 may indicate that the wearable device 104 is affixed to the body of the user 102. The user 102 may enter one or more of a password, fingerprint, acquire an image of their face, and so forth, using sensors 110 onboard one or more of the wearable device 104 or the user device 106. The authentication module 116 may generate the authentication credentials 118 which may then be provided to the requesting device 108.

The system 100 may include other computing devices, such as an authentication server 122 coupled to the one or more networks 120. The authentication server 122 may comprise one or more physical computing devices, virtual computing devices, or utilize a combination thereof. In some implementations, the authentication server 122 may not require end-user knowledge of the physical location and configuration of the system that delivers the services. For example, the authentication server 122 may be described using expressions including "on-demand computing", "software as a service (SaaS)", "platform computing", "network-accessible platform", "cloud services", "data centers", and so forth. Services provided by the authentication server 122 may be distributed across one or more physical or virtual devices. The authentication server 122 may include one or more modules and data including, but not limited to, a communication module 114, authentication module 116, authentication credentials 118, and so forth.

The authentication server 122 may be configured to provide authentication credentials 118 to the wearable device 104, the user device 106, the requesting device 108, and so forth. For example, the wearable device 104 may be provided with authentication credentials 118 from the authentication server 122. The wearable device 104 may then provide the authentication credentials 118 to requesting devices 108. Continuing the example, the wearable device 104 may provide authentication credentials 118 to a requesting device 108 such as an automated teller machine (ATM) to authorize financial transactions during a banking session.

The wearable device 104 may provide for a multifactor authentication process by itself, or by operating in conjunction with one or more other devices such as the user device 106, the requesting device 108, or the authentication server 122. For example, in the morning, the user 102 may don the wearable device 104 by latching a wristband wearable device 104 to his forearm. The sensors 110 onboard the wearable device 104 may provide sensor data 112 used by the authentication module 116 to determine that the wearable device 104 is being worn by previously authenticated user 102. The previously authenticated user 102 may be the rightful or intended owner of the wearable device 104. The user 102 may enter a password using an input device of the wearable device 104. For example, the password may comprise a series of motions, numbers or letters, speech input, and so forth. The user device 106 may include a camera or other image sensor on the user device 106 to acquire an image of the user 102, a fingerprint sensor to acquire fingerprint data from the user 102, or other sensors 110 to acquire sensor data 112. In one implementation the sensor data 112 from the wearable device 104 and the user device 106 may be provided to the authentication server 122. In another implementation the sensor data 112 from one or more of the wearable device 104 or the user device 106 may be compared locally to data previously stored on the respective device 104 or 106, or a hash or other data received from another device such as the authentication server 122. Information indicative of a successful or unsuccessful match may then be provided to the authentication server 122.

By comparing the sensor data 112 with previously stored data, the identity of the user 102 may be authenticated using the multiple factors of possession of the wearable device 104, such as password entry, appearance of the face of the user 102, and fingerprint. The authentication credentials 118 used to assert the identity of the user 102 may be provided to the wearable device 104, the user device 106, or the requesting device 108.

The wearable device 104 may be configured to deactivate itself, cease providing authentication credentials 118, or take other actions upon determination that an event has occurred. For example, the system 100 may be configured to provide an update every seven days to the software executing on the wearable device 104. The update may comprise a reload, replacement, upgrade, modification, and so forth, to the software stored at least in part on computer-readable storage media (CRSM) of the wearable device 104 and that is configured to execute on the wearable device 104. The event may comprise a failure of the wearable device 104 to receive or successfully install the update. The resulting action may comprise the deactivation of the wearable device 104, disabling one or more features of the wearable device 104, and so forth. For example, eight days after receiving the previous update, the wearable device 104 may disable the capability to provide authentication credentials 118 to requesting devices 108. Other events may result in other actions, such as described elsewhere in this disclosure.

In another example, the event may comprise removal of the wearable device 104 from proximity of the user 102, opening of a latch or other mechanism of the wearable device 104 to allow removal of the wearable device 104 from the body of the user 102, and so forth. Continuing the example, removal of the wearable device 104 from the body of the user 102 may result in the action of the discontinuation of providing authentication credentials 118, deauthentication of previously provided authentication credentials 118, discontinuation of keepalive data 124, and so forth.

In some implementations, keepalive data 124 may be exchanged between two or more devices. The keepalive data 124 may be used to determine an event, such as a loss of communication between two or more devices or arrival of another device. For example, the wearable device 104 may provide keepalive data 124 to the requesting device 108 so long as the wearable device 104 remains in proximity to the user 102. Continuing this example, should the user 102 remove the wearable device 104, the wearable device 104 may take the action of discontinuing transmission of keepalive data 124, or the wearable device 104 may modify the keepalive data 124 to indicate this change.

As a result of the event comprising the discontinuation of the keepalive data 124, the requesting device 108 may deauthenticate or deactivate the previously received authentication credentials 118. Continuing the example above, removal of the wristband of the wearable device 104 may result in the deauthentication of the ATM session.

In another implementation, keepalive data 124 may be exchanged between the wearable device 104 and the user device 106. For example, the wearable device 104 may provide keepalive data 124(1) to the user device 106, while the user device 106 may provide keepalive data 124(2) to the wearable device 104. So long as keepalive data 124 is provided as expected, authentication credentials 118 may be provided. For example, once a threshold amount of keepalive data 124 has been missed, deauthentication data may be provided to the requesting device 108, the providing of authentication credentials 118 may discontinued, and so forth.

Figure 2:
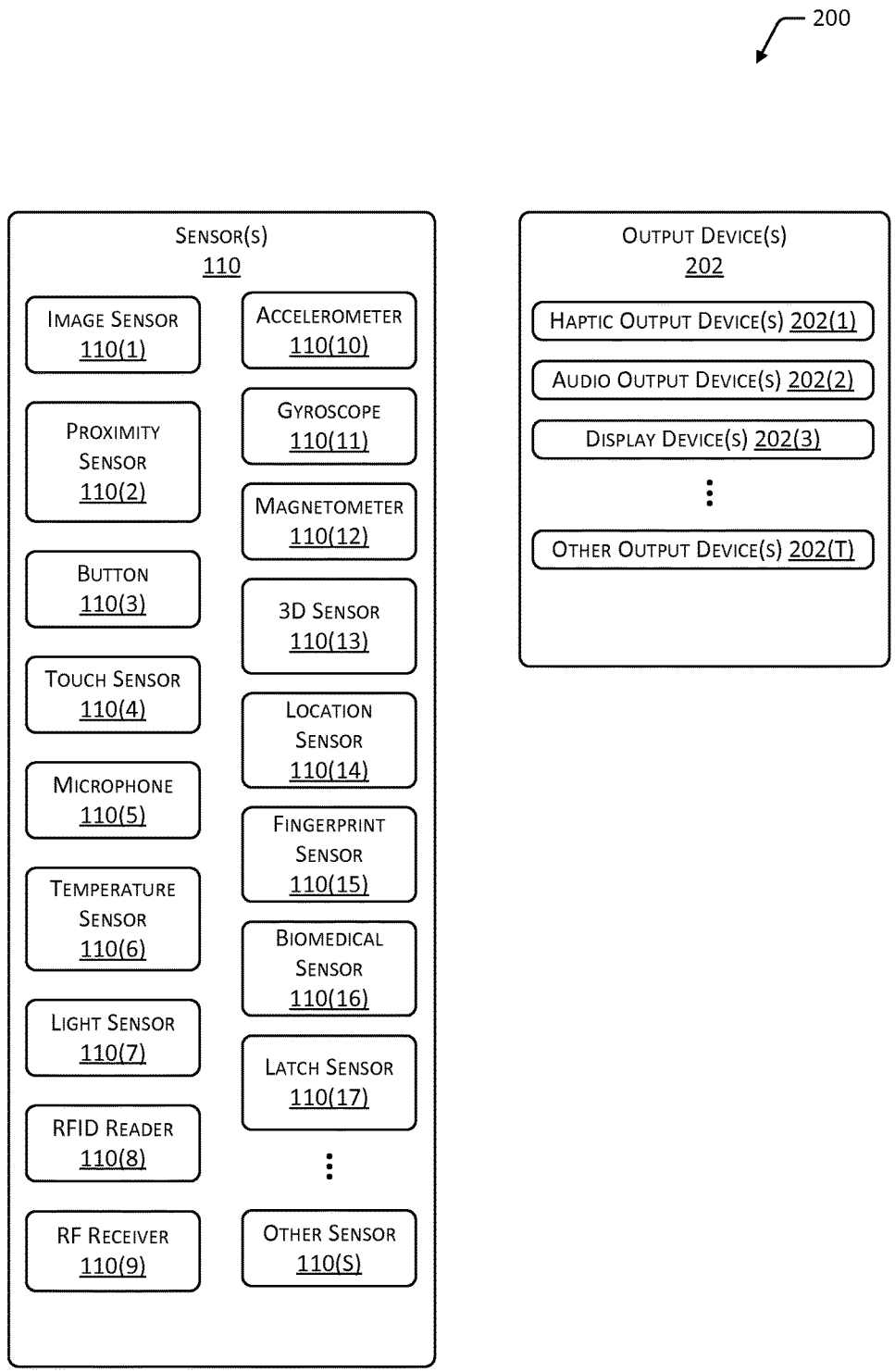
FIG. 2 illustrates a block diagram of sensors and output devices that may be used by the computing device(s) during operation.

FIG. 2 illustrates a block diagram 200 of sensors 110 and output devices 202 that may be used by the computing devices of the system 100 during operation. As described above with FIG. 1, the sensors 110 may generate sensor data 112.

The one or more sensors 110 may be integrated with or internal to the computing device, such as the wearable device 104 or the user device 106. For example, the sensors 110 may be built-in to the computing device during manufacture. In other implementations, the sensors 110 may be part of another device which is configurable to couple to the computing device. For example, the sensors 110 may comprise a device external to, but in communication with, the computing device using Bluetooth, Wi-Fi, 3G, 4G, LTE, ZigBee, Z-Wave, or another wireless or wired communication technology.

The sensors 110 may include one or more image sensors 110(1), such as cameras, scanners, and so forth. The image sensors 110(1) are configured to acquire images of a scene that may include at least a portion of the user 102. The image sensors 110(1) are configured to detect light in one or more wavelengths including, but not limited to, terahertz, infrared, visible, ultraviolet, and so forth. The image sensors 110(1) may comprise charge coupled devices (CCD), complementary metal oxide semiconductor (CMOS) devices, microbolometers, and so forth.

One or more proximity sensors 110(2) may be configured to provide sensor data 112 indicative of one or more of a presence or absence of an object, a distance to the object, or characteristics of the object. The proximity sensors 110(2) may use optical, electrical, ultrasonic, electromagnetic, or other techniques to determine a presence of an object. In some implementations, the proximity sensors 110(2) may use an optical emitter and an optical detector to determine proximity. For example, an optical emitter may emit light, a portion of which may then be reflected by the object back to the optical detector to provide an indication that the object is proximate to the proximity sensor 110(2). In another implementation, the proximity sensor 110(2) may comprise an optical emitter and an optical detector configured to determine proximity of an object by the object's blocking or interference with light emitted from the optical emitter and detected by the optical detector.

The optical proximity sensor 110(2) may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. In another implementation, a structured light pattern may be provided by the optical emitter. A portion of the structured light pattern may then be detected on the object using an image sensor 110(1) such as a camera, and based on an apparent distance between the features of the structured light pattern, the distance may be calculated. Other techniques may also be used to determine distance to the object.

The proximity sensor 110(2) may be configured to provide information indicative of composition of the object. For example, the optical proximity sensor 110(2) may characterize composition of the object based at least in part on reflection, fluorescence, transmission, and so forth. Continuing the example, light absorption across two or more wavelengths may be used to determine the presence of hemoglobin in the blood under the skin of the arm of the user 102. In another example, variations over time in the reflection or transmission of light may be used to determine cardiac pulse of the user 102. In another implementation, the proximity sensor 110(2) may detect the infrared light emitted by the body of the user 102 to determine proximity. For example, proximity may be determined by detection of an infrared heat source having a temperature of between 35 and 43 degrees Celsius.

In other implementations, the proximity sensors 110(2) may comprise a capacitive proximity sensor configured to provide an electrical field and determine a change in electrical capacitance due to presence or absence of an object within the electrical field.

One or more buttons 110(3) are configured to accept input from the user 102. The buttons 110(3) may comprise mechanical, capacitive, optical, or other mechanisms. For example, the buttons 110(3) may comprise mechanical switches configured to accept an applied force from a touch of the user 102 to generate an input signal.

The sensors 110 may include one or more touch sensors 110(4). The touch sensors 110(4) may use resistive, capacitive, surface capacitance, projected capacitance, mutual capacitance, optical, Interpolating Force-Sensitive Resistance (IFSR), or other mechanisms to determine the position of a touch or near-touch of the user 102. For example, the IFSR may comprise a material configured to change electrical resistance responsive to an applied force. The location within the material of that change in electrical resistance may indicate the position of the touch.

One or more microphones 110(5) may be configured to acquire information about sound present in the environment. In some implementations, arrays of microphones 110(5) may be used. These arrays may implement beamforming techniques to provide for directionality of gain. The one or more microphones 110(5) may be used to acquire audio data, such as speech from the user 102.

A temperature sensor (or thermometer) 110(6) may provide information indicative of a temperature of an object. The temperature sensor 110(6) in the computing device may be configured to measure ambient air temperature proximate to the user 102, the body temperature of the user 102, and so forth. The temperature sensor 110(6) may comprise a silicon bandgap temperature sensor, thermistor, thermocouple, or other device. In some implementations, the temperature sensor 110(6) may comprise an infrared detector configured to determine temperature using thermal radiation.

The sensors 110 may include one or more light sensors 110(7). The light sensors 110(7) may be configured to provide information associated with ambient lighting conditions such as a level of illumination. The light sensors 110(7) may be sensitive to wavelengths including, but not limited to, infrared, visible, or ultraviolet light. In contrast to the image sensor 110(1), the light sensor 110(7) may typically provide a sequence of amplitude (magnitude) samples, while the image sensor 110(1) provides a sequence of two-dimensional frames of samples (pixels). In some implementations, the image sensors 110(1) may be configured to act as light sensors 110(7) to provide data indicative of the level of illumination.

One or more radio frequency identification (RFID) readers 110(8), near field communication (NFC) systems, and so forth, may also be included as sensors 110. The user 102, objects around the computing device, locations within a building, and so forth, may be equipped with one or more radio frequency (RF) tags. The RF tags are configured to emit an RF signal. In one implementation, the RF tag may be a RFID tag configured to emit the RF signal upon activation by an external signal. For example, the external signal may comprise a RF signal or a magnetic field configured to energize or activate the RFID tag. In another implementation, the RF tag may comprise a transmitter and a power source configured to power the transmitter. For example, the RF tag may comprise a Bluetooth Low Energy (BLE) transmitter and battery. In other implementations, the tag may use other techniques to indicate its presence. For example, an acoustic tag may be configured to generate an ultrasonic signal, which is detected by corresponding acoustic receivers. In yet another implementation, the tag may be configured to emit an optical signal.

In one implementation, the RFID reader 110(8) may be configured to detect a tag in the possession of the user 102. For example, the tag may be embedded in a key fob, incorporated into a piece of jewelry, implanted under the skin of the user 102, and so forth.

One or more RF receivers 110(9) may also be included as sensors 110. In some implementations, the RF receivers 110(9) may be part of transceiver assemblies. The RF receivers 110(9) may be configured to acquire RF signals associated with Wi-Fi, Bluetooth, ZigBee, Z-Wave, 3G, 4G, LTE, or other wireless data transmission technologies. The RF receivers 110(9) may provide information associated with data transmitted via radio frequencies, signal strength of RF signals, and so forth. For example, information from the RF receivers 110(9) may be used to facilitate determination of a location of the computing device, to detect keepalive data 124, and so forth.

The sensors 110 may include one or more accelerometers 110(10). The accelerometers 110(10) may provide information such as the direction and magnitude of an imposed acceleration. Data such as rate of acceleration, determination of changes in direction, speed, and so forth, may be determined using the accelerometers 110(10).

A gyroscope 110(11) provides information indicative of rotation of an object affixed thereto. For example, the gyroscope 110(11) may indicate whether the computing device has been rotated.

A magnetometer 110(12) may be used to determine an orientation by measuring ambient magnetic fields, such as the terrestrial magnetic field. For example, output from the magnetometer 110(12) may be used to determine whether the device containing the sensor 110, such as the computing device, has changed orientation or otherwise moved. In other implementations, the magnetometer 110(12) may be configured to detect magnetic fields generated by another device.

One or more 3D sensors 110(13) may also be included in the sensors 110. The 3D sensors 110(13) are configured to acquire spatial or three-dimensional data, such as distance, 3D coordinates, point cloud, and so forth, about objects within a sensor field-of-view. The 3D sensors 110(13) may include range cameras, lidar systems, sonar systems, radar systems, coded aperture systems, structured light systems, stereo vision systems, optical interferometry systems, and so forth.

A location sensor 110(14) is configured to provide information indicative of a location. The location may be relative or absolute. For example, a relative location may indicate "kitchen", "bedroom", "conference room", and so forth. In comparison, an absolute location is expressed relative to a reference point or datum, such as a street address, geolocation comprising coordinates indicative of latitude and longitude, grid square, and so forth. The location sensor 110(14) may include, but is not limited to, radio navigation-based systems such as terrestrial or satellite-based navigational systems. The satellite-based navigation system may include one or more of a Global Positioning System (GPS) receiver, a Global Navigation Satellite System (GLONASS) receiver, a Galileo receiver, a BeiDou Navigation Satellite System (BDS) receiver, an Indian Regional Navigational Satellite System, and so forth. In some implementations, the location sensor 110(14) may be omitted or operate in conjunction with an external resource such as a cellular network operator providing location information, or Bluetooth beacons.

A fingerprint sensor 110(15) is configured to acquire fingerprint data. The fingerprint sensor 110(15) may use an optical, ultrasonic, capacitive, resistive, or other detector to obtain an image or other representation of features of a finger. For example, the fingerprint sensor 110(15) may comprise a capacitive sensor configured to generate an image of the fingerprint of the user 102.

Biomedical sensors 110(16) are configured to acquire biomedical data. Biomedical data may include electroencephalographic data, electrocardiographic data, electromyographical data, respiratory data, chemical or molecular data, skin or sub-cutaneous data, and so forth. For example, the biomedical sensors 110(16) may be configured to detect cardiac activity of the user 102. In another example, the biomedical sensors 110(16) may be configured to generate sensor data 112 providing information about the composition or structure of one or more excretions or samples from the user 102, such as, sweat, or blood.

One or more latch sensors 110(17) are configured to provide information indicative of whether the wearable device 104 is secured. For example, a latch sensor 110(17) may indicate whether a latch of a wristband of the wearable device 104 is opened or closed. The latch sensor 110(17) may comprise a switch, one or more electrical conductors, magnets, optical waveguides, and so forth. For example, the latch sensor 110(17) may comprise an optical emitter and detector configured to transmit light along an optical waveguide within a wristband. In another example, the latch sensor 110(17) may comprise a signal source configured to propagate a signal from one side of the latch to another when the latch is in a closed state. Continuing the example, the latch sensor 110(17) may comprise a radio frequency (RF) oscillator to which the latch is electrically or magnetically coupled.

The sensors 110 may include other sensors 110(S) as well. For example, the other sensors 110(S) may include strain gauges, anti-tamper indicators, and so forth. For example, strain gauges or strain sensors may be embedded within the wearable device 104 and may be configured to provide information indicating that at least a portion of the wearable device 104 has been stretched or displaced such that the wearable device 104 may have been donned or doffed.

In some implementations, the sensors 110 may include hardware processors, memory, and other elements configured to perform various functions. Furthermore, the sensors 110 may be configured to communicate by way of the network 120 or may couple directly with the computing device.

The computing device may include or may couple to one or more output devices 202. The output devices 202 are configured to generate signals which may be perceived by the user 102, detectable by the sensors 110, or a combination thereof.

Haptic output devices 202(1) are configured to provide a signal, which results in a tactile sensation to the user 102. The haptic output devices 202(1) may use one or more mechanisms such as electrical stimulation or mechanical displacement to provide the signal. For example, the haptic output devices 202(1) may be configured to generate a modulated electrical signal, which produces an apparent tactile sensation in one or more fingers of the user 102. In another example, the haptic output devices 202(1) may comprise piezoelectric or rotary motor devices configured to provide a vibration that may be felt by the user 102.

One or more audio output devices 202(2) are configured to provide acoustic output. The acoustic output includes one or more of infrasonic sound, audible sound, or ultrasonic sound. The audio output devices 202(2) may use one or more mechanisms to generate the acoustic output. These mechanisms may include, but are not limited to, the following: voice coils, piezoelectric elements, magnetorestrictive elements, electrostatic elements, and so forth. For example, a piezoelectric buzzer or a speaker may be used to provide acoustic output by an audio output device 202(2).

The display devices 202(3) may be configured to provide output that may be seen by the user 102 or detected by a light-sensitive detector such as the image sensor 110(1) or light sensor 110(7). The output may be monochrome or color. The display devices 202(3) may be emissive, reflective, or both. An emissive display device 202(3), such as using light emitting diodes (LEDs), is configured to emit light during operation. In comparison, a reflective display device 202(3), such as using an electrophoretic element, relies on ambient light to present an image. Backlights or front lights may be used to illuminate non-emissive display devices 202(3) to provide visibility of the output in conditions where the ambient light levels are low.

The display mechanisms of display devices 202(3) may include, but are not limited to, micro-electromechanical systems (MEMS), spatial light modulators, electroluminescent displays, quantum dot displays, liquid crystal on silicon (LCOS) displays, cholesteric displays, interferometric displays, liquid crystal displays, electrophoretic displays, LED displays, and so forth. These display mechanisms are configured to emit light, modulate incident light emitted from another source, or both. The display devices 202(3) may operate as panels, projectors, and so forth.

The display devices 202(3) may be configured to present images. For example, the display devices 202(3) may comprise a pixel-addressable display. The image may comprise at least a two-dimensional array of pixels or a vector representation of an at least two-dimensional image.

In some implementations, the display devices 202(3) may be configured to provide non-image data, such as text or numeric characters, colors, and so forth. For example, a segmented electrophoretic display device 202(3), segmented LED, and so forth, may be used to present information such as letters or numbers. The display devices 202(3) may also be configurable to vary the color of the segment, such as using multicolor LED segments.

Other output devices 202(T) may also be present. For example, the other output devices 202(T) may include scent/odor dispensers, document printers, three-dimensional printers, and so forth.

Figure 3:
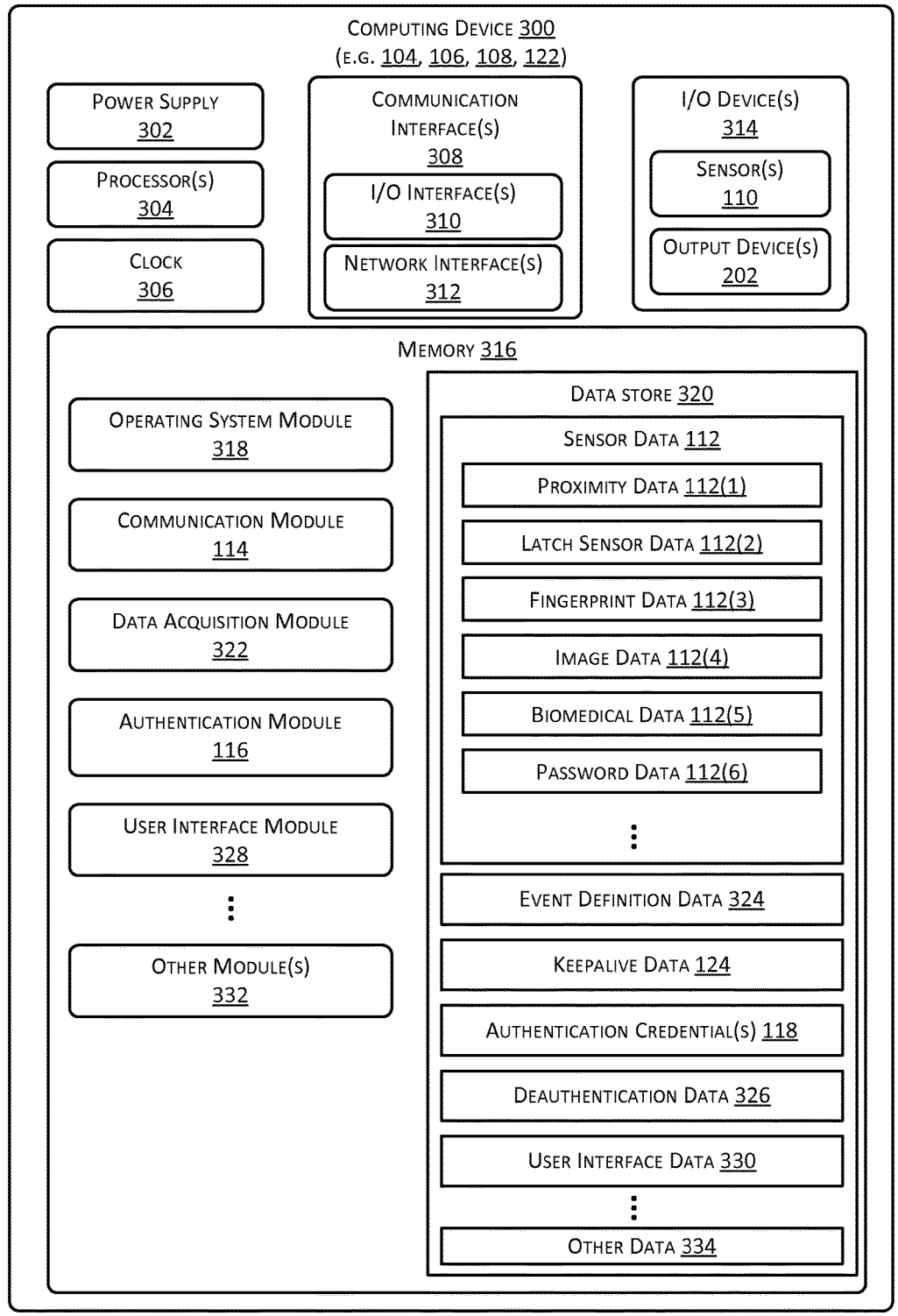
FIG. 3 illustrates a block diagram of the computing device(s).

FIG. 3 illustrates a block diagram of a computing device 300 configured to support operation of the system 100. As described above, the computing device 300 may be the wearable device 104, the user device 106, the requesting device 108, the authentication server 122, and so forth.

One or more power supplies 302 are configured to provide electrical power suitable for operating the components in the computing device 300. In some implementations, the power supply 302 may comprise a rechargeable battery, fuel cell, photovoltaic cell, power conditioning circuitry, and so forth.

The computing device 300 may include one or more hardware processors 304 (processors) configured to execute one or more stored instructions. The processors 304 may comprise one or more cores. One or more clocks 306 may provide information indicative of date, time, ticks, and so forth. For example, the processor 304 may use data from the clock 306 to generate a timestamp, trigger a preprogrammed action, determine that a software update is overdue, generate or provide keepalive data 124, and so forth.

The computing device 300 may include one or more communication interfaces 308 such as input/output (I/O) interfaces 310, network interfaces 312, and so forth. The communication interfaces 308 enable the computing device 300, or components thereof, to communicate with other devices or components. The communication interfaces 308 may include one or more I/O interfaces 310. The I/O interfaces 310 may comprise interfaces such as Inter-Integrated Circuit (I2C), Serial Peripheral Interface bus (SPI), Universal Serial Bus (USB) as promulgated by the USB Implementers Forum, RS-232, and so forth.

The I/O interface(s) 310 may couple to one or more I/O devices 314. The I/O devices 314 may include input devices such as one or more of a sensor 110, keyboard, mouse, scanner, and so forth. The I/O devices 314 may also include output devices 202 such as one or more of a display device 202(3), printer, audio output device 202(2), and so forth. In some embodiments, the I/O devices 314 may be physically incorporated with the computing device 300 or may be externally placed.

The network interfaces 312 are configured to provide communications between the computing device 300 and other devices, such as the sensors 110, routers, access, and so forth. The network interfaces 312 may include devices configured to couple to wired or wireless PANs, LANs, WANs, and so forth. For example, the network interfaces 312 may include devices compatible with Ethernet, Wi-Fi, Bluetooth, ZigBee, 3G, 4G, LTE, and so forth.

The computing device 300 may also include one or more busses or other internal communications hardware or software that allow for the transfer of data between the various modules and components of the computing device 300.

As shown in FIG. 3, the computing device 300 includes one or more memories 316. The memory 316 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 316 provides storage of computer-readable instructions, data structures, program modules, and other data for the operation of the computing device 300. A few example functional modules are shown stored in the memory 316, although the same functionality may alternatively be implemented in hardware, firmware, or as a system on a chip (SOC).

The memory 316 may include at least one operating system (OS) module 318. The OS module 318 is configured to manage hardware resource devices such as the I/O interfaces 310, the network interfaces 312, the I/O devices 314, and provide various services to applications or modules executing on the processors 304. The OS module 318 may implement a variant of the FreeBSD operating system as promulgated by the FreeBSD Project; other UNIX or UNIX-like operating system; a variation of the Linux operating system as promulgated by Linus Torvalds; the Windows operating system from Microsoft Corporation of Redmond, Wash., USA; the Android operating system from Google Corporation of Mountain View, Calif., USA; the iOS operating system from Apple Corporation of Cupertino, Calif., USA; or other operating systems.

Also stored in the memory 316 may be a data store 320 and one or more of the following modules. These modules may be executed as foreground applications, background tasks, daemons, and so forth. The data store 320 may use a flat file, database, linked list, tree, executable code, script, or other data structure to store information. In some implementations, the data store 320 or a portion of the data store 320 may be distributed across one or more other devices including the computing devices 300, network attached storage devices, and so forth.

The communication module 114 may be configured to establish communications with one or more of other computing devices 300, the sensors 110, or other devices. The communications may be authenticated, encrypted, and so forth. The communication module 114 may also control the communication interfaces 308.

The memory 316 may also store data from one or more of a data acquisition module 322 or the authentication module 116. The data acquisition module 322 is configured to acquire sensor data 112 from the one or more sensors 110. In some implementations, the data acquisition module 322 may perform some processing of the sensor data 112. For example, image data acquired by the image sensor 110(1) may be preprocessed to detect and characterize facial features present in the image data. In one implementation, the image processing may be performed at least in part by using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. For example, the OpenCV library may be used to detect faces, determine a relative position of facial features such as eyes, mouth, nose, and so forth.

The sensor data 112 may be stored in the data store 320 and may include one or more of the proximity data 112(1), latch sensor data 112(2), fingerprint data 112(3), image data 112(4), biomedical data 112(5), password data 112(6), and so forth. This data may be generated by the proximity sensor 110(2), latch sensor 110(17), fingerprint sensor 110(15), the image sensor 110(1), biomedical sensor 110(16), button 110(3) or touch sensor 110(4), respectively. For example, the user 102 may enter a password that is stored as password data 112(6) using the touch sensor 110(4).

The authentication module 116 may use input from one or more sensors 110 to determine occurrence of an event. The determination may be based on a comparison of the sensor data 112 with previously stored event definition data 324. For example, the event definition data 324 may specify that failure of the software installed on the wearable device 104 to be updated at least every seven days is an event. The event definition data 324 may also specify one or more actions associated with one or more events. Continuing the example, the failure to update event may result in the action of the wearable device 104 being disabled from providing authentication credentials 118 until an update occurs. Once an event has been determined to have occurred, the authentication module 116 may initiate or otherwise perform one or more actions.

The authentication module 116 may be configured to generate or receive keepalive data 124. For example, the authentication module 116 may be executed on the processor 304 and use data provided by the clock 306. The keepalive data 124 may include cryptographically secured information configured to protect against spoofing or man-in-the-middle attacks. In some implementations, keepalive data 124 may comprise a sequence number, date and time from the clock 306, or other information.

The authentication module 116 may be configured to generate or receive deauthentication data 326. The deauthentication data 326 may be configured to reduce the requesting devices 108 confidence in the authentication credentials 118 or to revoke the authentication credentials 118. For example, the authentication module 116 may determine that a period of time has elapsed since the user 102 has input a fingerprint using the wearable device 104. The resulting action as specified by the event definition data 324 and taken by the authentication module 116 may be to issue deauthentication data 326 indicating that the previously issued authentication credentials 118 are out of date. In another example, the authentication module 116 of the wearable device 104 may determine that the wearable device 104 has been removed from the user 102, and thus may send deauthentication data 326 to the requesting device 108 to revoke previously provided authentication credentials 118.

The actions taken by the authentication module 116 may include instructions for a user interface module 328 stored in the memory 316 to generate user interface data 330. The user interface data 330 is configured to operate the output devices 202 to generate output which may be perceptible to the user 102. For example, the authentication module 116 may determine that for distribution of authentication credentials 118 to proceed the user 102 must provide a fingerprint and enter a password on the wearable device 104. The user interface module 328 may generate user interface data 330 configured to provide haptic, audio, and display elements using the wearable device 104 to prompt to the user 102 to provide input.

Other modules 332 may also be present in the memory 316, as well as other data 334 in the data store 320. For example, the other modules 332 may include a voice analysis module, and the other data 334 may include voice profile data for the user 102.

In different implementations, different computing devices 300 may have different capabilities or capacities. For example, the authentication server 122 may have significantly more processor 304 capability and memory 316 capacity compared to the wearable device 104. In another example, the wearable device 104 may contain devices configured to render the wearable device 104, or portions thereof, inoperable. For example, the wearable device 104 may contain anti-tamper mechanisms configured to render the wearable device 104 unusable should someone attempt to disassemble it or to subvert (observe, copy, modify, or compromise) the computer executable instructions thereon.

Figure 4:
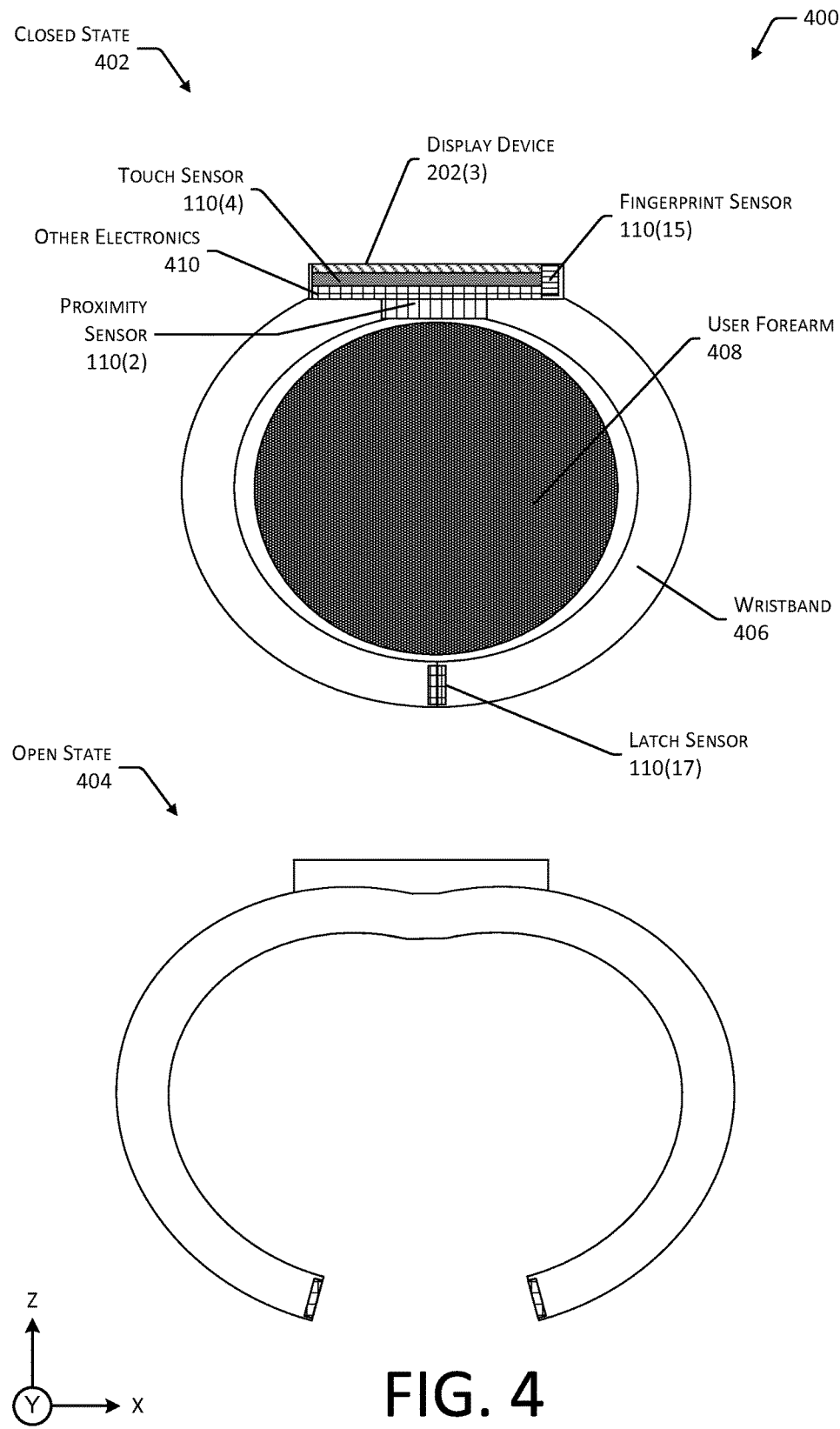
FIG. 4 illustrates a wearable device configured to provide authentication credentials.

FIG. 4 illustrates one implementation 400 of the wearable device 104 configured to provide authentication credentials 118. This illustration depicts a side or cross-sectional view of a wearable device 104 configured to be worn around a forearm or wrist of the user 102. The wearable device 104 is depicted in a closed state 402 and an open state 404. In the closed state 402, the wearable device 104 may not be easily removed from the arm of the user 102. In comparison, in the open state 404, the wearable device 104 may be removed from the arm of the user 102 without difficulty. For example, in the closed state 402, the inner diameter of the wearable device 104 is less than a maximum diameter of a radiocarpal joint of the arm of the user 102.

The wearable device 104 may comprise structures made of one or more of metal, plastic, ceramic, composite, or other material. These structures may include one or more members configured to maintain the wearable device 104 or a portion thereof proximate to the user 102 or article of clothing worn by the user 102. For example, one or more members may include arms, straps, pins, snaps, adhesives, mechanical interface fixtures, clamps, and so forth. The members may be engaged when they couple to at least a portion of the user 102, clothing of the user 102, and so forth. For example, the members may comprise straps to be worn and latched around the wrist of the user 102. One or more latches may be configured to selectively join or disjoin members from one another or from other structures.

In some implementations the wearable device 104 may be worn internally to the user 102. For example, the wearable device 104 may be implanted beneath the skin of the user 102, and so forth. Continuing the example, the structures may comprise biologically compatible materials such as a collagen matrix configured to be bound by the cells of the user 102 after implant. In another example, the wearable device 104 may be configured to be swallowed. Continuing the example, the wearable device 104 may be enclosed in a biologically inert case, such as ultra-high-molecular-weight polyethylene.

In the implementation depicted here, the wearable device 104 comprises a wristband 406. The wristband 406 may comprise one or more elements configured to encircle at least a portion of the forearm or wrist of the user 102 and maintain the wearable device 104 proximate to the user 102. The wristband 406 may comprise a series of links of rigid material or may comprise one or more pieces of elastomeric material. For example, the wristband 406 may include a series of metal links or may comprise a single piece of silicone rubber.

The wearable device 104 may include one or more sensors 110. For example, the wearable device 104 depicted includes a proximity sensor 110(2), a touch sensor 110(4), a fingerprint sensor 110(15), and the latch sensor 110(17). As described above, the proximity sensor 110(2) may comprise an optical proximity sensor, using an optical emitter and an optical detector. The optical emitter comprises one or more devices configured to generate emitted light. The optical emitter may comprise an LED, a laser, an incandescent lamp, a quantum dot, an electroluminescent element, a fluorescent light, and so forth. The emitted light may comprise coherent light or incoherent light. The optical emitter may include one or more optical components such as lenses, mirrors, diffraction gratings, shutters, polarizers, and so forth. In some implementations, the emitted light may be focused or collimated. The emitted light may interact with an object such as user's forearm 408. The optical detector detects light which scatters, reflects, fluoresces, transmits, or otherwise interacts with the object.

The optical detector is configured to detect incident light of one or more wavelengths. The optical detector may comprise a photodiode, photomultiplier, charge coupled device (CCD), complementary metal oxide device (CMOS), and so forth. In some implementations, the image sensor 110(1) may be used as the optical detector. The output from the image sensor 110(1) or the light sensor 110(7) in this implementation may or may not be an image.

The optical emitter and the optical detector may be configured to emit and detect, respectively, light in one or more wavelengths. For example, the optical emitter and the optical detector may be configured to operate at one or more of infrared, visible, or ultraviolet wavelengths. In some implementations, multiple wavelengths may be used to reduce false positives of object detection, characterize the object such as detecting blood, and so forth.

The latch sensor 110(17) is configured to generate sensor data 112 indicative of whether the wristband 406 is in the closed state 402 or the open state 404. For example, the latch sensor 110(17) may comprise an RF oscillator coupled to one or more electrical conductors within the wristband 406. When the wristband 406 is in the closed state 402, the RF oscillator may produce a particular output frequency, but differs compared to when the wristband 406 is in the open state 404.

The wearable device 104 may also comprise output devices 202. For example, the wearable device 104 depicted here includes a display device 202(3) such as a LED display. Other output devices 202 such as haptic output devices 202(1), audio output devices 202(2), and so forth, may also be present but are not depicted in this illustration.

Other electronics 410 may also be present in the wearable device 104. For example, the other electronics 410 may include one or more of the elements associated with a computing device 300 described regard to FIG. 3.

Figure 5:
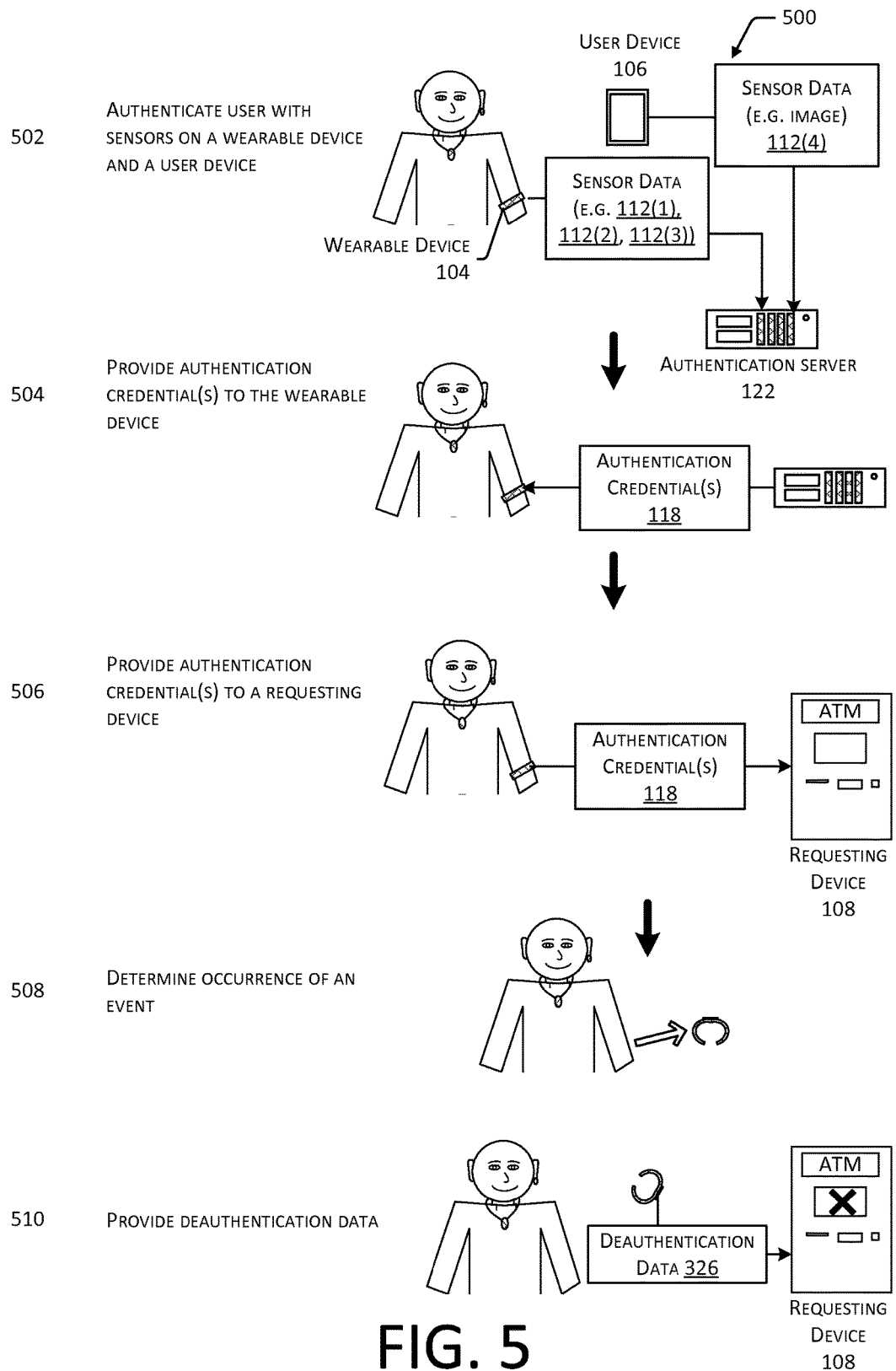
FIG. 5 illustrates a scenario in which the user is authenticated using sensor data from the wearable device and the user device, and authentication credentials are provided to a requesting device.

FIG. 5 illustrates a scenario 500 of using the wearable device 104 to provide authentication credentials 118 to a requesting device 108.

At 502, the user 102 is authenticated in a multifactor authentication process using sensor data 112 obtained from sensors 110 on the wearable device 104 and on the user device 106. For example, the wearable device 104 may provide proximity data 112(1), latch sensor data 112(2), and fingerprint data 112(3) obtained from sensors 110 onboard the wearable device 104 to the authentication server 122. In some implementations, the user device 106 or another device may relay this data to the authentication server 122 on behalf of the wearable device 104. Continuing the example, the user device 106 provides image data 112(4) acquired from an image sensor 110(1) onboard the user device 106. In other implementations, the user device 106 may provide authentication credentials 118. For example, the user device 106 may include the fingerprint sensor 110(15) and provide to the authentication server 122 an indication that a fingerprint provided by the user 102 corresponds to a previously stored fingerprint. In another example, the user device 106 may include the touch sensor 110(4) and may generate password data 112(6) based on touches by the user 102.

At 504, authentication credentials 118 are provided to the wearable device 104. For example, the authentication server 122 may transmit at least a portion of the authentication credentials 118 to the wearable device 104. The wearable device 104 may store the authentication credentials 118 in the memory 316 thereof. In other implementations, the wearable device 104 or another device may generate the authentication credentials 118. In a further implementation, the wearable device 104 may store a token or other information indicative of the authentication credentials 118 in lieu of the authentication credentials 118.

At 506, the wearable device 104 provides authentication credentials 118 to the requesting device 108. For example, the user 102 may activate the wearable device 104 to transmit the authentication credentials 118 to the requesting device 108. In another example, the requesting device 108 may transmit a request for authentication credentials 118 that is received by the wearable device 104. The wearable device 104 may provide a prompt to the user 102 requesting authorization to allow the authentication credentials 118 to be provided to the requesting device 108. Alternately, the wearable device 104 may automatically respond and provide the authentication credentials 118 without input by the user 102.

At 508, the wearable device 104 determines an occurrence of an event. For example, the wearable device 104 may have been removed from the body of the user 102. The removal may be detected based at least in part on one or more of a change in proximity data 112(1), a change in latch sensor data 112(2), and so forth. In another example, the event may comprise expiration of the timer such as the wearable device 104 not receiving an expected software update or keepalive data 124.

At 510, the wearable device 104 may provide deauthentication data 326 or discontinue providing the authentication credentials 118. For example, deauthentication data 326 may be sent to the requesting device 108 indicating that the authentication credentials 118 are no longer valid. In response, the requesting device 108 may be configured to deauthenticate the session, allow only some activities that are associated with a lesser confidence in the authentication, and so forth. In one implementation, instead of or in addition to providing the deauthentication data 326, the wearable device 104 may discontinue or modify transmission of keepalive data 124 to the requesting device 108.

Illustrative Processes

Figure 6:
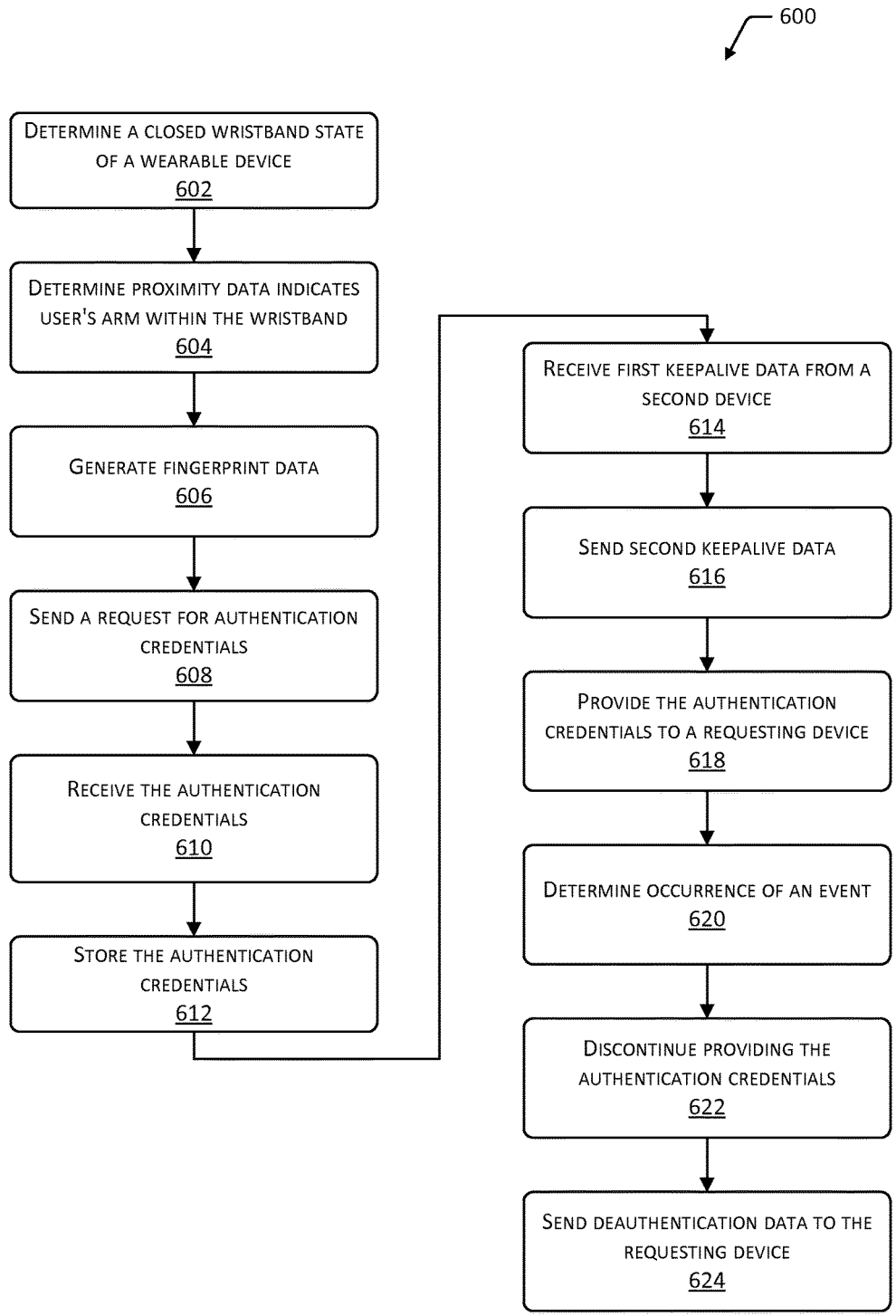
FIG. 6 illustrates a flow diagram of a process of a wearable device providing authentication credentials to a requesting device and receiving keepalive data from a second device.

FIG. 6 illustrates a flow diagram 600 of a process of a wearable device 104 providing authentication credentials 118 to a requesting device 108 and receiving keepalive data 124 from a second device, such as the user device 106. Physical objects such as a wearable device 104 and the user device 106, such as a smart phone or tablet computer, may be incorporated into a multifactor authentication process, such that possession of both objects by the user 102 is part of obtaining and maintaining the validity of the authentication credentials 118 used to identify the user 102.

Block 602 determines a wristband state that indicates the wristband 406 is in the closed state 402. For example, the latch sensor data 112(2) from the latch sensor 110(17) may indicate the wristband 406 is closed.

Block 604 determines the proximity data 112(1) indicates the arm of the user 102 or a portion thereof is within the wristband 406. For example, the proximity sensor 110(2) may detect the blood and cardiac pulse present in the arm of the user 102.

Block 606 generates fingerprint data 112(3) using the fingerprint sensor 110(15). For example, the fingerprint sensor 110(15) may be located onboard the wearable device 104, or as part of the user device 106.

Block 608 sends a request for the authentication credentials 118 to another computing device 300, such as the authentication server 122 or the user device 106. The request may comprise data indicative of one or more of the following: the wristband state, the proximity data 112(1), or the fingerprint data 112(3).

Block 610 receives authentication credentials 118 using a network interface 312. For example, the network interface 312 may comprise a wireless interface compliant with at least a portion of the Wi-Fi or Bluetooth standards. In some implementations, the wearable device 104 may generate at least a portion of the authentication credentials 118.

Block 612 stores the authentication credentials 118 in the memory 316. In some implementations, the authentication credentials 118 may be encrypted.

Block 614 receives first keepalive data 124(1) from another computing device 300, such as the user device 106, the requesting device 108, the authentication server 122, and so forth.

Block 616 sends second keepalive data 124(2) to another computing device 300, such as the user device 106, the requesting device 108, the authentication server 122, and so forth. As described above, the use of the keepalive data 124 may provide an assurance of communication between the devices and system 100, as well as assurance about the authentication credentials 118 distributed thereby.

In some implementations, the other computing device, such as the user device 106, may participate in the authentication process. For example, the user device 106 may use an image sensor 110(1) to acquire image data 112(4) of the user 102. The user device 106 may provide the image data 112(4), or data based at least in part on the image data 112(4), to the authentication server 122. The user device 106, having participated in the authentication process may also provide first keepalive data 124(1) to the wearable device 104. The first keepalive data 124(1) may be sent at time intervals based on output from the clock 306 of the user device 106. Continuing the example, the first keepalive data 124(1) may be sent every five seconds using the network interface 312.

Block 618 provides the authentication credentials 118 to the requesting device 108. For example, the wearable device 104 may send the authentication credentials 118 to the requesting device 108 responsive to an input by the user 102, request from the requesting device 108, or combination thereof. The providing of the authentication credentials 118 may include a one-time transmission, or an ongoing transmission of the authentication credentials 118, or a portion thereof. For example, the authentication credentials 118 may be provided as a stream cipher that is delivered over a series of time such as while the authentication credentials 118 are in use.

Block 620 determines occurrence of an event. The determination may be based at least in part on the sensor data 112 as acquired by one or more of the sensors 110. The sensor data 112 may be acquired from a plurality of computing devices 300 or sensors 110 configured to provide sensor data 112. The occurrence of an event may include one or more conditions occurring or failing to occur. In a first implementation, the event may comprise a timeout interval of time expiring, such as measured by the clock 306. For example, the user 102 or another party such as a system administrator may designate that authentication credentials 118 may only be provided for 24 hours after performance of the multifactor authentication process.

In a second implementation, the event may comprise absence of or failure to receive the first keepalive data 124(1) from the second device such as the user device 106 for a predetermined period of time. For example, the wearable device 104 and the user device 106 may be taken out of communication range of one another resulting in a loss of the exchange of the keepalive data 124.

In a third implementation, the event may comprise a change in the wristband 406 state from a closed state 402 to an open state 404. For example, the wearable device 104 may determine that the wristband 406 has been removed from the forearm of the user 102 based on a change in the latch sensor data 112(2) as generated by the latch sensor 110(17).

In a fourth implementation, the event may comprise a change in the proximity data 112(1) indicative of an absence of the user's forearm 408 within the wristband 406. For example, the proximity data 112(1) may indicate that no object is present, or the object present has characteristics not associated with a human forearm.

As described above, the event may comprise multiple conditions. For example, the event may comprise a change in the wristband state and the proximity data 112(1) within a threshold period of time.

In some implementations, the determination of the event may be made by other devices participating in the system 100. For example another computing device 300 such as the user device 106 that has been exchanging keepalive data 124 with the wearable device 104 may determine an event has occurred when the keepalive data 124 is not received as scheduled or is incomplete or corrupt. For example, the user device 106 may be configured to determine an absence for a predetermined period of time of the second keepalive data 124(2) as received from the wearable device 104. Responsive to the absence, the user device 106 may send deauthentication data 326 to the requesting device 108, indicative of deauthentication of the authentication credentials 118.

Block 622 discontinues providing the authentication credentials 118. For example, the discontinuation may comprise a cessation in transmission of authentication credentials 118, non-responsiveness to subsequent requests for authentication credentials 118, and so forth.

Block 624 sends deauthentication data 326 to the requesting device 108. As described above, the deauthentication data 326 provides information indicative of deauthentication of the authentication credentials 118. The deauthentication may include information indicative of a loss in confidence of the authentication credentials 118, instructions to revoke the authentication credentials 118, and so forth. The deauthentication data 326 may be sent instead of, or in addition to, the discontinuation of providing the authentication credentials 118.

In other implementations, other mechanisms may be used to indicate that the event has occurred and confidence in the authentication or the corresponding authentication credentials 118 has been reduced. For example, transmission of keepalive data 124 may cease, contents of the keepalive data 124 may be modified, and so forth.

Other actions may be taken responsive to the occurrence of an event. For example, the authentication credentials 118 may be deleted from memory 316. In another example, the wearable device 104 may be configured to render itself inoperable such as by erasing portions of its memory 316, initiating an electrical overload of one or more onboard components, and so forth.

In some implementations, the interaction between the wearable device 104 and the requesting device 108 may use a network interface 312 using a different protocol, frequencies, and so forth, than that used for the exchange of keepalive data 124 or other signaling. For example, the wearable device 104 and the requesting device 108 may communicate with one another using near field communication while the wearable device 104 and the user device 106 communicate with one another using Bluetooth.

Figure 7:
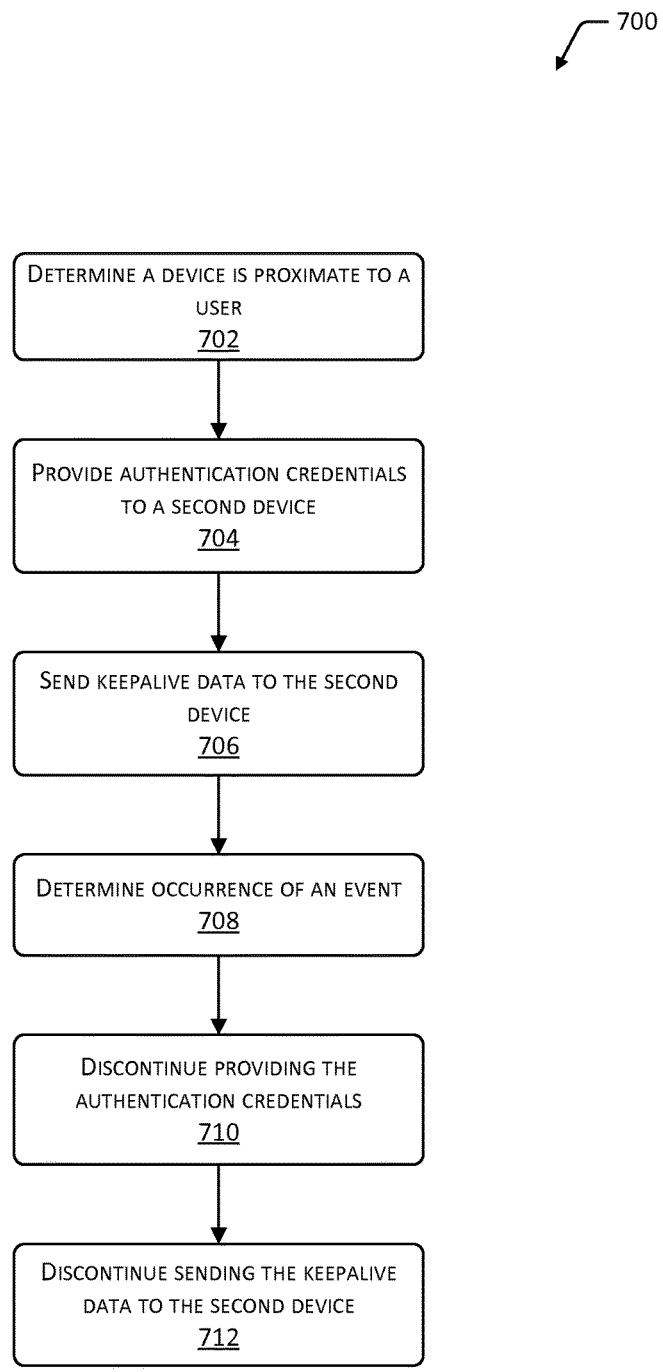
FIG. 7 illustrates a flow diagram of a process of a wearable device providing keepalive data and authentication credentials to a second device.

FIG. 7 illustrates a flow diagram 700 of a process of a wearable device 104 providing keepalive data 124 and authentication credentials 118 to a requesting device 108.

Block 702 determines, using the sensor data 112, the wearable device 104 or a portion thereof is proximate to the user 102. For example, the wearable device 104 may comprise a pendant on the chain. A proximity sensor 110(2) may be configured to determine that the pendant is close to the torso of the user 102.

Using the network interface 312, block 704 provides authentication credentials 118 to the requesting device 108. In some implementations, providing authentication credentials 118 may be responsive to input by the user 102. For example, the user 102 may activate a control to provide the authentication credentials 118. In another example, providing authentication credentials 118 may be responsive to a match between fingerprint data 112(3) acquired using the fingerprint sensor 110(15) and stored fingerprint data. For example, fingerprint data 112(3) may be acquired using the fingerprint sensor 110(15) onboard the wearable device 104. The processor 304 onboard the wearable device 104 may compare the fingerprint data 112(3) with the stored fingerprint data. Upon determination that the fingerprint data 112(3) and the stored fingerprint data match within a predetermined threshold, the authentication credentials 118 may be provided to the requesting device 108.

Block 706 sends keepalive data 124 to the requesting device 108. As described above, the keepalive data 124 may comprise data that is encrypted or otherwise cryptographically secured. For example, keepalive data 124 may be signed using a digital certificate.

Block 708 determines occurrence of an event. The determination may be based on the sensor data 112, output of the clock 306, input from the user 102, failure to receive keepalive data 124, or from other information. In a first implementation, the event may comprise a timeout interval expiring, such as when a predetermined period of time since an update of the computer-executable instructions on the wearable device 104 has elapsed. In a second implementation, the event may comprise receipt of the notification indicating availability of updated computer-executable instructions for the wearable device 104. In a third implementation, the event may comprise non-receipt of keepalive data 124 from another device external to the wearable device 104 for a predetermined period of time. In a fourth implementation, the event may comprise a determination that the wearable device 104 is no longer proximate to the user 102.

In a fifth implementation, the event may comprise a determination that a location of the wearable device 104 is outside of a predetermined geographic boundary. For example, authentication credentials 118 may be provided while the wearable device 104 is within the border of the United States, and not when the wearable device 104 is beyond the border. Location of the wearable device 104 may be determined based on input from one or more sensors 110, such as the RF receiver 110(9), the location sensor 110(14), and so forth.

In a sixth implementation, the event may comprise a loss of communication with the external device, such as the user device 106, the requesting device 108, the authentication server 122, and so forth.

In a seventh implementation, the event may comprise an expiration of the authentication credentials 118 as received from an authentication server 122. For example, the wearable device 104 may send a request to an authentication server 122. The wearable device 104 may then receive the authentication credentials 118 from the authentication server 122 or a delegate of the authentication server 122. The wearable device 104 may initiate a timeout timer for the authentication credentials 118. The event may then comprise expiration of the timeout timer.

Block 710 discontinues providing the authentication credentials 118.

Block 712 discontinues sending the keepalive data 124 to the requesting device 108.

In some implementations, other actions may be performed responsive to the determination that one or more events have occurred. For example, the authentication credentials 118 may be deleted from the memory 316 or otherwise rendered inaccessible. In another example, the deauthentication data 326 indicative of the deauthentication of the authentication credentials 118 may be provided to the requesting device 108.

Figure 8:
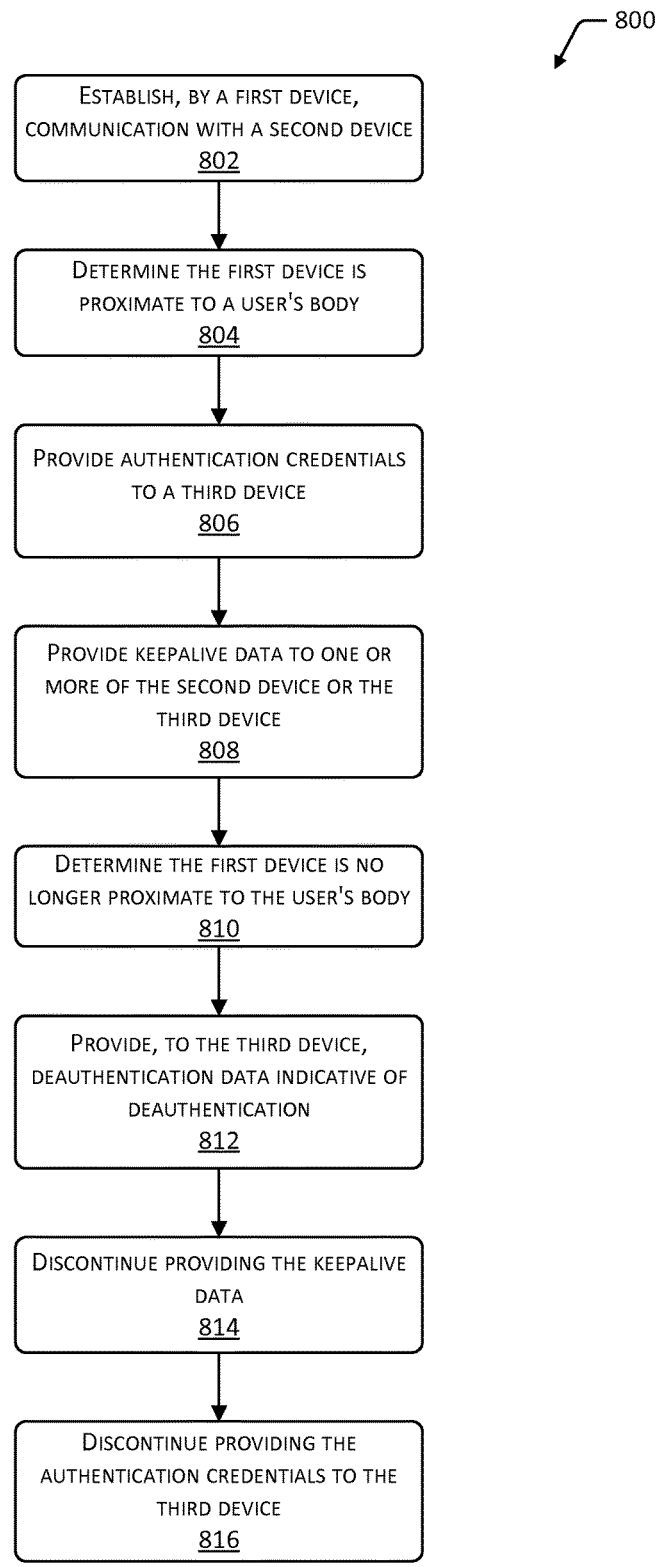
FIG. 8 illustrates a flow diagram of a process of a wearable device providing authentication credentials to other devices based on a determination that the wearable device is proximate to the user.

FIG. 8 illustrates a flow diagram 800 of a process of a wearable device 104 providing authentication credentials 118 to other devices based on a determination that the wearable device 104 is proximate to the user 102.

Block 802 establishes, at a first device, communication with a second device. For example, the wearable device 104 may establish a Bluetooth connection with the user device 106. The second device, such as user device 106, may be configured to participate in a multifactor authentication process by acquiring biometric data about the user 102. The biometric data may include one or more of a fingerprint, an image of at least a portion of the user 102, or biomedical data 112(5) such as an electrocardiogram an electromyogram, and so forth. For example, the image of at least a portion of the user 102 may comprise the face of the user 102, hand of the user 102, iris of the user 102, and so forth. The biometric data or biomedical data 112(5) may be provided to the first device or to a fourth device. For example, the biometric data may be provided to the wearable device 104 or to an authentication server 122. In some implementations, the first device may acquire biometric data.

In another implementation, the wearable device 104 may include an RFID reader 110(8) and the second device may comprise an RFID or NFC tag in the possession of the user 102. The tag may be worn, carried, implanted, and so forth. For example, the tag may be implanted beneath the skin of the user 102 proximate to the location on the user's 102 body where the wearable device 104 will be worn. Continuing the example, the tag may be implanted in the anterior portion of the user's 102 wrist where the wearable device 104 is a wristband 406 worn around the wrist.

Block 804 determines the first device is proximate to the body of the user 102. For example, the proximity sensor 110(2) on the wearable device 104 may determine that the wearable device 104 is proximate to the skin of the user 102 while the latch sensor 110(17) indicates the latch is engaged. Based on these determinations, the authentication module 116 may determine that the wearable device 104 is proximate to the body of the user 102. For example, the RFID reader 110(8) may detect the presence of the tag beneath the skin of the user 102.

In some implementations, the proximity sensor 110(2) may comprise one or more optical components such as an optical emitter and an optical detector. The determination of proximity may be based on one or more of a detection of the cardiac pulse of the user 102, blood of the user 102, thermal emission of the user 102, and so forth. The determination of proximity may also be based on a combination of these factors including the optical data and the latch sensor data 112(2).

Block 806, responsive to the determination the first device is proximate to the body of the user 102, provides authentication credentials 118 to a third device. For example, the wearable device 104 may provide the authentication credentials 118 to the requesting device 108 using a Wi-Fi connection. In some implementations, the network interface 312 used to provide authentication credentials 118 may be different from that used to establish communication between the first device and the second device. In another implementation, the wearable device 104 may send the authentication credentials 118 to another device such as the user device 106 for relay to the requesting device 108. In yet another implementation, the wearable device 104 may send data to another device such as the user device 106 or the authentication server 122 configured to trigger that device to send the authentication credentials 118 to the requesting device 108.

The first device may be configured to generate the authentication credentials 118. For example, the wearable device 104 may generate the authentication credentials 118 based on user input, sensor data 112, and so forth.

In another implementation, the first device may receive the authentication credentials 118 from another computing device 300. For example, the wearable device 104 may receive the authentication credentials 118 from the user device 106, the authentication server 122, and so forth.

In yet another implementation, the first device may acquire sensor data 112 from the one or more sensors 110 onboard the first device. At least a portion of the sensor data 112, or data based at least in part on the sensor data 112, may be sent to the second device. For example, an indication of a match of the fingerprint data 112(3) with previously stored fingerprint data, or a hash of the fingerprint data 112(3) may be sent to the user device 106. The second device may respond by providing authentication credentials 118 to the first device. The second device may generate the authentication credentials 118, or may operate in conjunction with the authentication server 122 to provide authentication credentials 118. The first device may then receive the authentication credentials 118 from the second device.

Block 808 provides keepalive data 124 to one or more of the second device or the third device. For example, the wearable device 104 may provide keepalive data 124 to one or more of the user device 106, the requesting device 108, or another computing device 300.

Block 810 determines the first device is no longer proximate to the body of the user 102. For example, the proximity sensor 110(2) onboard the wearable device 104 may generate proximity data 112(1) indicating the skin of the user 102 is no longer proximate to the proximity sensor 110(2). In another example, the RFID reader 110(8) may no longer detect the presence of the tag implanted beneath the skin of the user 102.

Block 812 provides information indicative of deauthentication or revocation to the third device. For example, the wearable device 104 may send deauthentication data 326 to the requesting device 108.

Block 814 discontinues the providing the keepalive data 124. For example, the first device may discontinue sending the keepalive data 124.

Block 816 discontinues the providing the authentication credentials 118. For example, the first device may cease sending authentication credentials 118.

Instead of, or in addition to, the determination the first device is no longer proximate to the body of the user 102, in other implementations, other events may be determined that result in one or more actions. For example, the first device may determine, using the clock 306, an event that a time limit has been reached. Upon determination of the event, the process may proceed to one or more of block 814 or 816. For example, upon expiration of the time limit, the wearable device 104 may discontinue providing authentication credentials 118. In other implementations upon occurrence of the event the time limit has been reached, the wearable device 104 may be rendered inoperable.

The processes discussed herein may be implemented in hardware, software, or a combination thereof. In the context of software, the described operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage media may include, but is not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A device comprising:
a first network interface;
one or more members configured to maintain the device proximate to a user;
one or more sensors configured to generate sensor data;
a memory, storing computer-executable instructions; and
a hardware processor, wherein the hardware processor is configured to execute the computer-executable instructions to:
determine, using the sensor data, that the device is proximate to the user;
provide, using the first network interface, authentication credentials to a second device;
send keepalive data to the second device, wherein the keepalive data comprises encrypted data;
determine occurrence of an event; and
responsive to the determination of the event, provide deauthentication data to the second device.

2. The device of claim 1, the one or more members comprising a wristband, the wristband comprising:
a strap;
a latch configured to selectively join or disjoin the strap; and
wherein the one or more sensors comprises a latch sensor configured to generate data indicative of whether the strap is in a joined state or a disjoined state; and
further wherein the hardware processor is configured to determine that the device is proximate to the user based at least in part on the data from the latch sensor.

3. The device of claim 1, wherein the event comprises one or more of:
a timeout interval expiring,
availability of updated computer-executable instructions for the device,
non-receipt of the keepalive data from an external device for a predetermined period of time,
a determination that the device is no longer proximate to the user,
location of the device being outside of a predetermined geographic boundary, or
loss of communication with the external device.

4. The device of claim 1, wherein the one or more sensors comprise a fingerprint sensor; and the hardware processor is further configured to:
receive fingerprint data from the fingerprint sensor;
compare the fingerprint data with stored fingerprint data;
determine that the fingerprint data and the stored fingerprint data match within a predetermined threshold.

5. The device of claim 1, wherein the one or more sensors comprise an optical emitter and an optical detector; and wherein to determine that the device is proximate to the user, the hardware processor in conjunction with the optical emitter and the optical detector is further configured to:
  detect cardiac pulse of the user,
  detect blood of the user, or
  detect body heat of the user.

6. The device of claim 1, the computer-executable instructions further configured to, responsive to the determination of the event:
  delete the authentication credentials from the memory; and
  send data indicative of revocation of the authentication credentials to the second device.

7. The device of claim 1, the computer-executable instructions further configured to:
  send a request to an authentication device for the authentication credentials;
  receive the authentication credentials from the authentication device;
  start a timeout timer for the authentication credentials; and
  wherein the event comprises expiration of the timeout timer.

8. The device of claim 1, the computer-executable instructions further configured to, responsive to the determination of the event:
  send a request to an authentication device for the authentication credentials;
  receive the authentication credentials from the authentication device;
  start a timeout timer for the authentication credentials;
  determine that the timeout timer is about to expire; and
  wherein providing the keepalive data to the second device us based on the timeout timer about to expire.

9. A first device comprising:
  a first network interface;
  one or more sensors configured to generate sensor data;
  a first clock;
  a first memory, storing first computer-executable instructions; and
  a first hardware processor, wherein the first hardware processor is configured to execute the first computer-executable instructions to:
    establish communication with a second device;
    determine the first device is proximate to at least a portion of a body of a user;
    responsive to the determination that the first device is proximate to the user's body, provide authentication credentials to a third device using the first network interface;
    provide keepalive data to the second device;
    determine occurrence of an event; and
    discontinue sending the keepalive data to the second device.

10. The first device of claim 9, the first hardware processor is further configured to execute the first computer-executable instructions to:
  provide the keepalive data to the third device;
  determine the first device is no longer proximate to the user's body; and
  responsive to the determination the first device is no longer proximate to the user's body:
    provide deauthentication information to the third device;
    discontinue providing the keepalive data; and
    discontinue providing the authentication credentials.

11. The system of claim 9, the first hardware processor further configured to execute the first computer-executable instructions to:
  receive biometric data about the user from the second device; and
  generate the authentication credentials based on the biometric data.

12. The first device of claim 9, further comprising a member configured to hold the first device proximate to the user when coupled to at least a portion of the user;
  the one or more sensors of the first device comprising:
    a latch sensor configured to indicate the member is coupled or uncoupled to the at least a portion of the user;
    an optical sensor; and
  wherein to determine that the first device is proximate to the user's body, the first hardware processor is configured to:
    detect, using the optical sensor, cardiac pulse of the user,
    detect, using the optical sensor, blood of the user, or
    determine, using the latch sensor, that the member is coupled.

13. The first device of claim 9, the first hardware processor is further configured to execute the first computer-executable instructions to:
  receive, from the one or more sensors, biometric data about the user; and
  generate the authentication credentials based on the biometric data.

14. The first device of claim 9, the first hardware processor is further configured to execute the first computer-executable instructions to:
  receive the authentication credentials using the first network interface; and
  wherein the authentication credentials comprise one or more of a username, a password, encrypted data, a security token, or a cryptographic value.

15. The first device of claim 9, the first hardware processor is further configured to execute the first computer-executable instructions to:
  acquire the sensor data from at least a subset of the one or more sensors;
  send a portion of the sensor data to the second device; and
  receive the authentication credentials from the second device.

16. The first device of claim 9, the first hardware processor is further configured to execute the first computer-executable instructions to:
  determine, using the first clock, that a time limit has been reached; and
  discontinue providing the authentication credentials.

17. A first device comprising:
  a first network interface;
  one or more sensors configured to generate sensor data;
  a memory, storing computer-executable instructions; and
  a hardware processor, wherein the hardware processor is configured to execute the computer-executable instructions to:
    establish communication with a second device;
    determine that first the device is proximate to at least a portion of a body of a user;
    responsive to the determination that the first device is proximate to the user's body, provide authentication credentials to a third device using the first network interface; and responsive to a determination of an event, provide keepalive data to one or more of the second device or the third device.

18. The device of claim 17, the computer-executable instructions further configured to, responsive to the determination of the event:
   determine a second event;
   responsive to the determination of the second event, provide deauthentication data to one or more of the second device or the third device; and
   delete the authentication credentials from the memory.

19. The device of claim 17, the computer-executable instructions further configured to:
   send a request to an authentication device for the authentication credentials;
   receive the authentication credentials from the authentication device;
   start a timeout timer for the authentication credentials;
   determine that the timeout timer is about to expire; and
   based on the timeout timer about to expire, provide the keepalive data to the one or more of the second device or the third device.

20. The device of claim 17, the computer-executable instructions further configured to:
   receive the authentication credentials using the first network interface; and
   wherein the authentication credentials comprise one or more of a username, a password, encrypted data, a security token, or a cryptographic value.

* * * * *